(12) United States Patent
Li et al.

(10) Patent No.: US 11,922,211 B2
(45) Date of Patent: Mar. 5, 2024

(54) SYSTEM AND METHOD FOR CROSS-ARCHITECTURE TRUSTED EXECUTION ENVIRONMENT MIGRATION

(71) Applicant: VMware, LLC, Palo Alto, CA (US)

(72) Inventors: Ye Li, Newton Highlands, MA (US);
Anoop Jaishankar, Fremont, CA (US);
Matthew Lentz, Palo Alto, CA (US);
David E. Ott, Chandler, AZ (US)

(73) Assignee: VMware, Inc., Palo Alto, CA (US)

( * ) Notice: Subject to any disclaimer, the term of this patent is extended or adjusted under 35 U.S.C. 154(b) by 340 days.

(21) Appl. No.: 17/124,291

(22) Filed: Dec. 16, 2020

(65) Prior Publication Data
US 2022/0188146 A1    Jun. 16, 2022

(51) Int. Cl.
*G06F 9/48* (2006.01)
*H04L 9/40* (2022.01)

(52) U.S. Cl.
CPC ........ *G06F 9/4862* (2013.01); *H04L 63/0428* (2013.01)

(58) Field of Classification Search
CPC .... G06F 9/4862; G06F 9/5072; G06F 9/5088; G06F 21/53; H04L 63/0428; H04L 63/0435; H04L 63/20
See application file for complete search history.

(56) References Cited

U.S. PATENT DOCUMENTS

| | | | | |
|---|---|---|---|---|
| 7,533,289 | B1* | 5/2009 | Castillo | G06F 11/1662 |
| | | | | 714/15 |
| 8,762,662 | B1* | 6/2014 | Blitzer | G06F 3/0647 |
| | | | | 711/170 |
| 2010/0287345 | A1* | 11/2010 | Cherian | G06F 3/0604 |
| | | | | 711/170 |
| 2012/0102201 | A1* | 4/2012 | Nakagawa | G06F 21/80 |
| | | | | 709/226 |

(Continued)

OTHER PUBLICATIONS

Choudhary, A., Govil, M., Singh, G. et al. A critical survey of live virtual machine migration techniques. J Cloud Comp 6, 23 (2017). https://doi.org/10.1186/s13677-017-0092-1 (Year: 2017).*

(Continued)

*Primary Examiner* — Jorge A Chu Joy-Davila
(74) *Attorney, Agent, or Firm* — King Intellectual Asset Management

(57) ABSTRACT

System and method for managing migration of trusted execution environments (TEEs) based on migration policies utilizes a source migration agent in the source host computer and a destination migration agent in a destination host computer to migrate a source TEE in the source host computer to the destination host computer. A migration policy data of the source TEE is first transmitted to the destination migration agent from the source migration agent to determine whether the destination host computer satisfies migration policies specified in the migration policy data. In response to a determination that the destination host computer satisfies the migration policies specified in the migra- (Continued)

tion policy data, a destination TEE is created in the destination host computer and memory pages of the source TEE are transmitted to the destination TEE. The memory pages are then restored at the destination TEE for execution.

20 Claims, 7 Drawing Sheets

(56) References Cited

U.S. PATENT DOCUMENTS

| | | | | |
|---|---|---|---|---|
| 2012/0110237 | A1* | 5/2012 | Li | G06F 9/45558 |
| | | | | 711/6 |
| 2012/0254866 | A1* | 10/2012 | Iwamatsu | G06F 3/061 |
| | | | | 718/1 |
| 2013/0097296 | A1* | 4/2013 | Gehrmann | G06F 9/4856 |
| | | | | 709/223 |
| 2018/0183580 | A1* | 6/2018 | Scarlata | G06F 21/53 |
| 2019/0012110 | A1* | 1/2019 | Okano | G06F 3/0659 |
| 2019/0068557 | A1* | 2/2019 | Noel | G06F 21/602 |
| 2021/0409199 | A1* | 12/2021 | Tsirkin | H04L 9/3226 |

OTHER PUBLICATIONS

Yingwei Luo, Binbin Zhang, Xiaolin Wang, Zhenlin Wang, Yifeng Sun and Haogang Chen, "Live and incremental whole-system migration of virtual machines using block-bitmap," 2008 IEEE International Conference on Cluster Computing, Tsukuba, 2008, pp. 99-106, doi: 10.1109/CLUSTR.2008.4663760. (Year: 2008).*

U.S. Appl. No. 16/671,106; 25 pages, filed Oct. 31, 2019.

AMD, "AMD SEV-SNP: Strengthening VM Isolation with Integrity Protection and More", White Paper, Jan. 2020, 20 pgs.

* cited by examiner

| Offset | Bit(s) | Name | Description |
|---|---|---|---|
| 000h | 0 | SGXv1 | Backends allowed for the target TEE to migrate to. (For cross-platform migration) |
| | 1 | SGXv2 | |
| | 2 | SEV-ES | |
| | 3 | SEV-SNP | |
| | 4 | TDX | |
| | 5 | ESXi | |
| | 15:6 | Reserved | |
| 002h | 7:0 | VSE_API_MAJOR | VSE interface and capability requirements. |
| 003h | 7:0 | VSE_API_MINOR | |
| 004h | 15:0 | ESX_VERSION | ESXi version |
| 006h | 15:0 | VSE Runtime Ver | VSE Runtime Version |
| 008h | 15:0 | SGX Version | SGX backend hardware version requirement |
| 00ah | 15:0 | SEV Version | SEV backend hardware version requirement |
| 00ch | 15:0 | TDX Version | TDX backend hardware version requirement |
| 00eh | 63:0 | Reserved for future policies | |

FIG. 3

SYSTEM AND METHOD FOR CROSS-ARCHITECTURE TRUSTED EXECUTION ENVIRONMENT MIGRATION

BACKGROUND

Intel® Software Guard Extension (SGX) is a hardware technology that can be used to provide isolated application environments, or enclaves, for secure applications. The Intel SGX features isolated, encrypted memory regions for user-level application code and data. It ensures data confidentiality and code integrity even if the operating system is compromised. The SGX hardware provides attestation services to verify the authenticity of platforms and integrity of enclaves.

Intel SGX has been highly influential within the world of trusted execution environments (TEEs) in recent years, increasing interest in various use cases and programming models. Another trend has been the growing diversity of TEE hardware technologies and programming models. In addition to SGX, TEEs have been developed in both academia and industry using Arm TrustZone and RISC-V. Importantly, other TEE schemes have been developed which leverage hardware features not specifically designed for TEEs but usable as building blocks. Examples of such technologies include AMD Secure Encrypted Virtualization (SEV) and Intel Multi-Key Total Memory Encryption (MKTME), which provide hardware encrypted virtual machines (VMs) that remove the hypervisor from the chain of trust for VM/application owners. Thus, there is a need to unify the different TEE hardware backends.

In addition to the unification of different TEE hardware backends, there is a need for TEE migration policy enforcement. TEE migration between different computing systems is a necessary feature due to its benefit for data center management. Some hardware TEE backends, such as AMD SEV, offer hardware migration policy and policy enforcement during migration. This is usually implemented in hardware/firmware leveraging Root-of-Trust of the manufacturer. Thus, hardware migration policies and policy enforcement mechanisms provided by the backends can be relied upon when TEEs are migrated between these backends.

However, when TEEs are migrated between backends without hardware migration support (e.g., one SGX backend to another SGX backend) or between cross-architecture backends (e.g., SGX backend to SEV backend), there may be insufficient migration policies and policy enforcement mechanisms to satisfy user security and functional requirements (e.g., what kind of backends are allowed as a valid destination and what version of hardware/software are expected on the destination platform) for the TEE migrations.

BRIEF DESCRIPTION OF THE DRAWINGS

FIG. 3 is an illustration of a structure of a virtual secure enclave (VSE) TEE migration policy data for a TEE in accordance with an embodiment of the invention.

Throughout the description, similar reference numbers may be used to identify similar elements.

DETAILED DESCRIPTION

Figure 1:
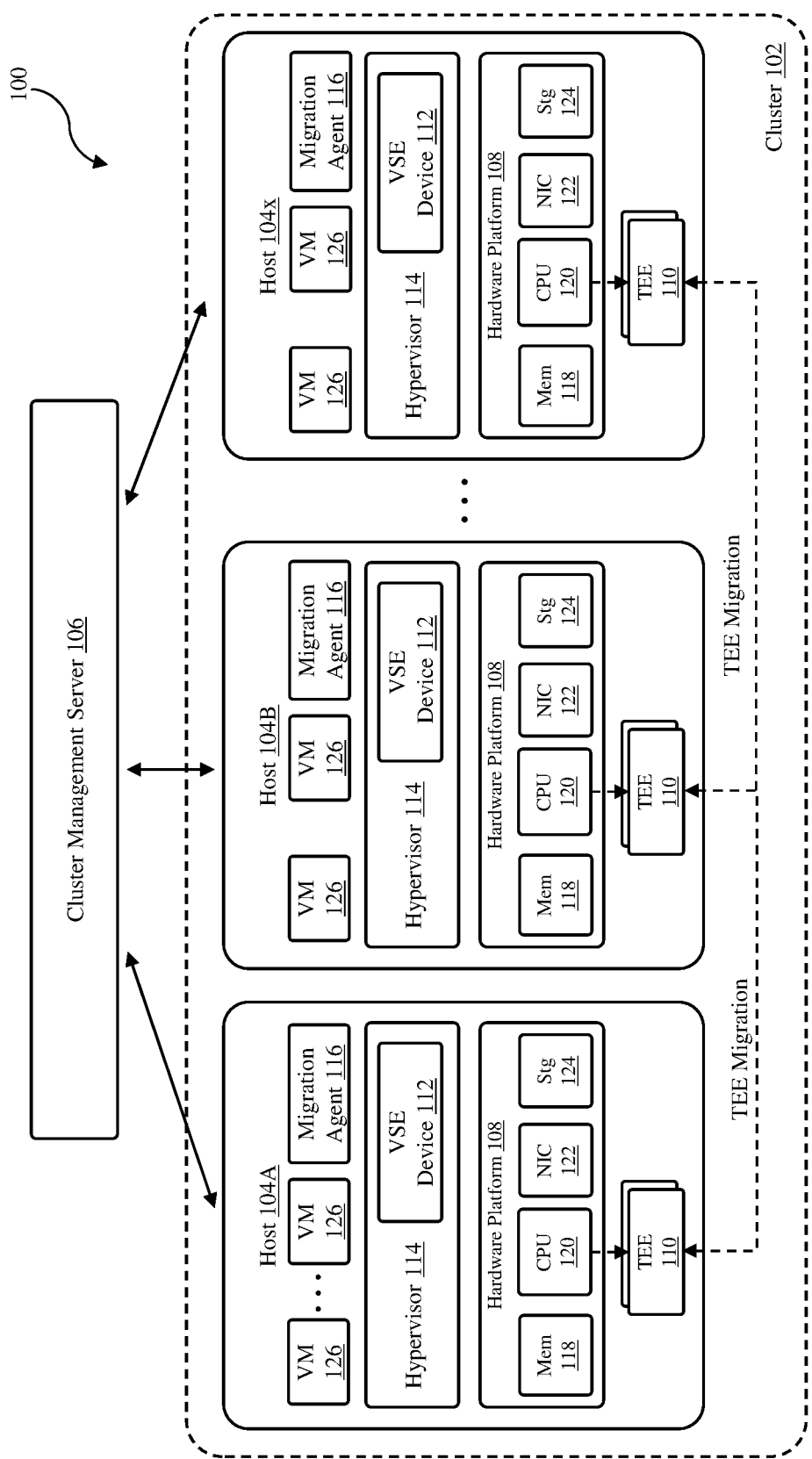
FIG. 1 is a block diagram of a distributed computing system with trusted execution environment (TEE) migration enforcement in accordance with an embodiment of the invention.

FIG. 1 illustrates a distributed computing system 100 in accordance with an embodiment of the invention. As shown in FIG. 1, the distributed computing system 100 includes a cluster 102 of host computers 104A, 104B . . . 104x (sometimes simply referred to herein as host computers 104) and a cluster management server 106. Each of the host computers 104 includes a hardware platform 108 with a hardware trusted execution environment (TEE) mechanism (not shown in FIG. 1), which can provide TEEs 110 for sensitive content, such as user codes and data. As described below, the distributed computing system 100 uses a virtual secure enclave (VSE) device 112, which may be part of a hypervisor 114, in each host computer to unify different hardware TEE technologies that may be available in the host computers 104. The use of the VSE device 112 provides for easy discovery and configuration of TEE capabilities available in any computer system. Thus, the VSE device 112 provides a unified interface to use the available hardware TEE mechanism in any system, which simplifies software development kit (SDK) integration and avoids N SDKs to M hardware TEE technologies mappings. In addition, the use of the VSE device 112 allows for migration of software processes from a computer system with one hardware TEE mechanism to another computer system with a different hardware TEE mechanism.

As illustrated in FIG. 1, the TEEs 110 that are created in the host computers 104 in the cluster 102 may be migrated to different host computers in the cluster 102. For example, the TEEs 110 in the host computer 104A may be migrated to the host computer 104B and/or the host computer 104x. However, for various situations, it may be desirable to only allow a TEE in one host computer to be migrated to host computers with certain hardware and/or software. Thus, when an attempt is made to migrate a TEE to a host computer that do not have certain hardware and/or software, the migration of the TEE to that host computer is prevented. These rules for permitting and preventing TEE migration are referred to herein as TEE migration policies.

In order to enforce the TEE migration policies, which may be customized for each TEE, the distributed computing system 100 includes a migration agent 116 running in each host computer 104. As described below, the migration TEE agents in the host computers 104 enforces TEE migration policies and only allow TEEs to be migrated to destination host computers that satisfy the TEE migration policies of the TEEs. Thus, TEEs are prevented from being migrated to host computers that violate the TEE migration policies.

In FIG. 1, the hardware platform 108 of each of the host computers 104 is shown to include memory 118, a central processing unit (CPU) 120, a network interface controller (NIC) 122 and storage 124. However, the host computers 104 may include other hardware components commonly found in a server grade computer. The hardware resources of the hardware platforms 108 may be used to provide virtualized resources for virtual computing instances (VCIs) 126, which are created by virtualization software, e.g., the hypervisors 114, in their respective host computers 104. As used herein, a VCI can be any isolated software entity that can run on a computer system, such as a software application, a software process, a virtual machine (VM) or a virtual container. A VM is an emulation of a computer system in the form of a software computer that, like a physical computer, can run an operating system and applications. A VM may be comprised of a set of specification and configuration files and is backed by the physical resources of a physical host computer. An example of such a VM is a VM created using VMware vSphere® solution made commercially available from VMware, Inc of Palo Alto, California A virtual container is a package that relies on virtual isolation to deploy and run applications that access a shared operating system (OS) kernel. An example of a virtual container is a virtual container created using a Docker engine made available by Docker, Inc. In FIG. 1, the VCIs 126 in the host computers 104 are illustrated as being VMs. However, in other embodiments, the VCIs 126 may be a different type of VCIs that are created by appropriate virtualization software. The host computers 104 of the distributed computing system 100 are described in more detail below with respect to FIG. 2.

The cluster management server 106 of the distributed computing system 100 operates to manage and monitor the cluster 102 of host computers 104. The cluster management server 106 may be configured to allow an administrator to create the cluster 102, add host computers to the cluster and delete host computers from the cluster. The cluster management server 106 may be configured to monitor the current configurations of the host computers 104 and any VCIs running on the host computers, for example, VMs. The monitored configurations may include hardware configuration of each of the host computers 104 and software configurations of each of the host computers. The monitored configurations may also include VCI hosting information, i.e., which VCIs (e.g., VMs) are hosted or running on which host computers 104. The monitored configurations may also include information regarding the VCIs running on the different host computers 104 in the cluster 102.

The cluster management server 106 may also perform operations to manage the VCIs and the host computers 104 in the cluster 102. As an example, the cluster management server 106 may be configured to perform various resource management operations for the cluster, including VCI placement operations for either initial placement of VCIs and/or load balancing. The process for initial placement of VCIs, such as VMs, may involve selecting suitable host computers 104 in the cluster 102 for placement of the VCIs based on, for example, memory and central processing unit (CPU) requirements of the VCIs, the current memory and CPU loads on all the host computers in the cluster, and the memory and CPU capacity of all the host computers in the cluster. In addition, the cluster management server 106 may select destination host computers 104 in the cluster 102 for TEE migration as part an automated process or in response to user input.

In some embodiments, the cluster management server 106 may be a physical computer. In other embodiments, the cluster management server 106 may be implemented as one or more software programs running on one or more physical computers, such as the host computers 104 in the cluster 102, or running on one or more VMs, which may be hosted on any of the host computers 104. In an implementation, the cluster management server 106 is a VMware vCenter™ server with at least some of the features available for such a server.

Figure 2:
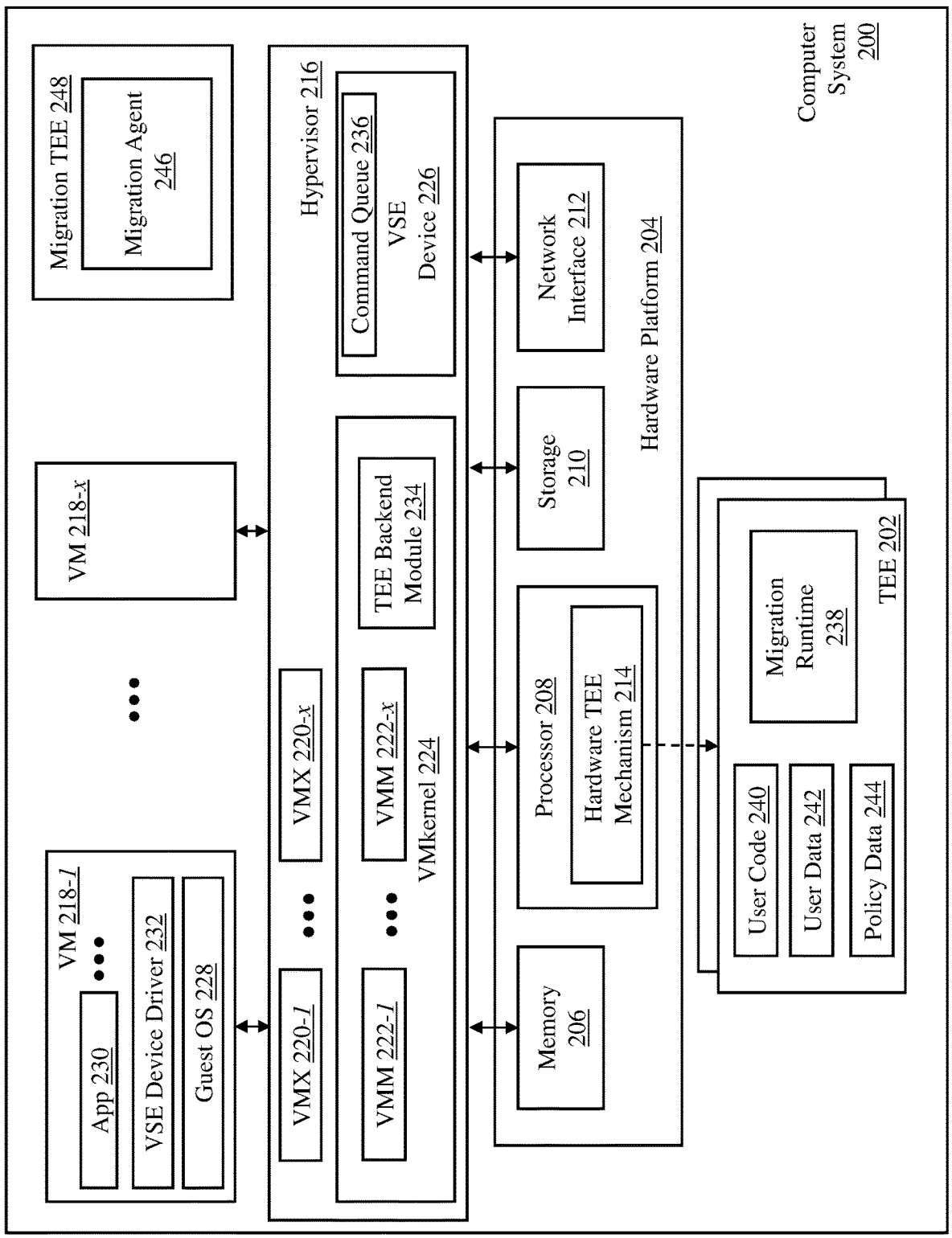
FIG. 2 is a block diagram of a representative host computer in the distributed computing system in accordance with an embodiment of the invention.

Turning now to FIG. 2, a host computer 200 that is representative of the host computers 104 in the distributed computing system 100 in accordance with an embodiment of the invention is shown. The host computer 200 implements a computer system architecture to manage TEEs 202 created in the host computer regardless of the hardware TEE mechanism available in the host computer and to enforce TEE migration policies, which may be selectively defined for the TEEs.

The computer system 200 includes a physical hardware platform 204, which includes at least one or more system memories 206, one or more processors 208, a storage 210, and a network interface 212. Each system memory 206, which may be random access memory (RAM), is the volatile memory of the computer system 200. Each processor 208 can be any type of a processor, such as a central processing unit (CPU) commonly found in a server computer. In the illustrated embodiment, the processor 208 includes a hardware TEE mechanism 214, for example, Intel® SGX mechanism. The hardware TEE mechanism 214 provides the secure TEEs 202, which can be memory enclaves, that can be used by software processes running in the computer system 200. The storage 210 can be any type of non-volatile computer storage with one or more storage devices, such as a solid-state devices (SSDs) and hard disks. Although the storage 210 is shown in FIG. 2 as being a local storage, in other embodiments, the storage 210 may be a remote storage, such as a network-attached storage (NAS). The network interface 212 is any interface that allows the computer system 200 to communicate with other devices through one or more computer networks. As an example, the network interface 212 may be a network interface controller (NIC).

The computer system 200 further includes a virtualization software 216 running directly on the hardware platform 204 or on an operation system (OS) of the computer system 200. The virtualization software 216 can support one or more VCIs. In addition, the virtualization software 216 can deploy or create VCIs on demand. Although the virtualization software 216 may support different types of VCIs, the virtualization software 216 is described herein as being a hypervisor, which enables sharing of the hardware resources of the host computer 200 by VCIs in the form of VMs that are hosted by the hypervisor. One example of a hypervisor that may be used in an embodiment described herein is a VMware ESXi™ hypervisor provided as part of the VMware vSphere® solution made commercially available from VMware, Inc. of Palo Alto, California.

The hypervisor 216 provides a device driver layer configured to map physical resources of the hardware platform 204 to "virtual" resources of each VM supported by the hypervisor such that each VM has its own corresponding virtual hardware platform. Each such virtual hardware platform provides emulated or virtualized hardware (e.g., memory, processor, storage, network interface, etc.) that may, for example, function as an equivalent, conventional hardware architecture for its corresponding VM.

In FIG. 2, the computer system 200 is shown to include a number of VMs 218-1 to 218-$x$ supported by the hypervisor 216. Each of these VMs has a virtual hardware platform, which is an emulation of the physical hardware platform that has been allocated to that VM. Thus, each virtual hardware platform includes at least emulated memory, emulated processor, virtual storage and virtual network interface, which correspond to the memory 206, the processor 208, the storage 210 and the network interface 212, respectively, of the hardware platform 204 of the computer system 200. The virtual hardware platform for each of the VMs is provided by a virtual machine executable (VMX) module 220-*i* and a virtual machine monitor (VMM) 222-*i* for that VM in the hypervisor 216. Thus, there are same number of VMX module 220-1 to 220-*x* and same number of VMMs 222-1 to 222-*x* as the VMs 218-1 to 218-*x*.

In an embodiment, the VMMs 222-1 to 222-*x* run in a VMkernel 224 of the hypervisor 216. The VMkernel is a Portable Operating System Interface (POSIX) like operating system. The VMkernel is the liaison between the VMs 218-1 to 218-*x* and the physical hardware that supports them. The VMkernel runs on bare metal and is responsible for allocating memory, scheduling CPUs and providing other hardware abstraction and OS services.

For each VM 218-*i*, the associated VMM 222-*i* and VMX module 220-*i* for that VM operate to emulate the hardware resources of the computer system 200 for that VM. In addition to the emulation of the computer hardware resources for a VM, each VMX module is responsible for handling input/output (I/O) to devices that are not critical to performance. The VMX module is also responsible for communicating with user interfaces and other modules. Each VMM is responsible for virtualizing the guest operating system (OS) instructions from the VM and the management of memory. In addition, the VMM operates to pass storage and network I/O requests to the VMkernel 224, and to pass all other requests to the VMX module. As described below, the VMM and VMX module for each VM may also assist in the transmission of TEE commands between the hardware TEE mechanism 214 and a virtual secure enclave (VSE) device 226, which may be running in a virtualized environment provided by the hypervisor 216. The VSE device 226 will be described further below.

With the support of the hypervisor 216, the VMs 218-1 to 218-*x* provide isolated execution spaces for guest software. Each VM includes a guest operating system (OS) 228, and one or more guest applications 230, some of which may be secure applications that use the TEEs 202 created by the hardware TEE mechanism 214 via the VSE device 226. The guest OS 228 manages virtual hardware resources made available to the corresponding VM by the hypervisor 216, and, among other things, the guest OS forms a software platform on top of which the guest applications 230 run. Each VM may also include a VSE device driver 232 to communicate with the VSE device 226 using universal application programming interface (API) commands.

The host computer 200 with the deployed VMs 218-1 to 218-*x* may have various software processes running in the computer system. As an example, one or more software processes may be running on the host OS of the computer system 200, one or more software processes may be running on the guest OSs 228 of the VMs as guest applications 230, and one or more software processes may be running in the hypervisor 216. Any of these software processes may use the TEEs 202 provided by the hardware TEE mechanism 214 via the VSE device 226, as described below. In some embodiments, the TEEs 202 created by the hardware TEE mechanism 214 may be in the form of VMs. Such TEEs will be referred to herein as TEE VMs.

The VSE device 226 operates to interface with software processes, such as the applications 230 running in the VMs 218-1 to 218-*x*, to manage the secure TEEs 202, which can be, for example, created, configured, executed and removed.

Thus, the software processes only need to communicate with the VSE device 226 for any operations relating to TEEs. However, these operations with respect to TEEs are actually performed by the hardware TEE mechanism 214 of the computer system 200. Thus, the software processes do not have to follow the specific protocols required by the hardware TEE mechanism 214 of the computer system 200 to instruct the hardware TEE mechanism to perform various operations with respect to TEEs. The interactions with the hardware TEE mechanism 214 are executed by a TEE backend module 234. In an embodiment, TEE operation commands issued to the VSE device 226 from a software process, such as one of the guest applications 230, via the VSE device driver 232 using the universal API commands can be viewed as being translated by the TEE backend module 234 to TEE operation commands to the hardware TEE mechanism 214 in the computer system 200 using API commands specific to the hardware TEE mechanism 214. These translated TEE operation commands can then be issued to the hardware TEE mechanism 214 so that the hardware TEE mechanism can execute the requested TEE operations.

In the illustrated embodiment, the VSE device 226 includes a command queue 236 that can store TEE commands issued by software processes in the computer system 200, such as the guest applications 230 running in the VMs 218-1 to 218-*x*. The command queue 236 is exposed to the secure applications 230 so that the secure applications can send TEE commands to the command queue 236 of the VSE device 226 through the virtual SE device driver 232.

In an embodiment, when a new TEE command is added to the command queue 236 of the VSE device 226 from a guest application 230 running in the VM 218-*i*, the VMM 222-*i* associated with that VM is notified of the new TEE command. In response to the notification, a request is made by the VMM 222-*i* to the VMX module 220-*i* associated with that VM for emulation of the command queue 236 in the VSE device 226. In response to this request, the command queue 236 in the VSE device 226, including all the new or outstanding TEE commands, is emulated by the VMX module. As part of this emulation process, the new TEE commands are retrieved by the VMX module. In addition, the new TEE commands are parsed by the VMX module to extract information contained in the new TEE commands, such as descriptions of TEE operations included in the TEE commands. In the illustrated embodiment, the emulation of the command queue 236 in the VSE device 226 is performed within the VMkernel 224, which may have performance advantages. However, in other embodiments, the emulation of the command queue 236 in the VSE device 226 may be performed elsewhere in the hypervisor 216.

Based on the information contained in the new TEE commands, services corresponding to the new TEE commands are requested from the TEE backend module 234 by the VMX module 220-*i*. In an embodiment, these services requests may be made using system calls to the TEE backend module 234 inside the VMkernel 224. In response to these service requests, the hardware TEE mechanism 214 is engaged by the TEE backend module 234 to fulfill the requested services or operations. In an embodiment, this engagement or interaction may involve issuing appropriate TEE commands for the requested services to the hardware TEE mechanism 214, which would cause the hardware TEE mechanism to execute the requested services or operations, such as TEE creation, TEE configuration, TEE execution and TEE removal operations. Thus, the applications 230 that are issuing the TEE commands do not have to conform to any requirements of the hardware TEE mechanism 214 of the computer system 200, which may vary from one computer system to another computer system depending on the hardware TEE capabilities of the systems.

The TEEs 202 that are created by the VSE device 226 via the hardware TEE mechanism 214 include sensitive information, such as user codes 240 and user data 242, that needs to be secure. In addition, each TEE 202 includes VSE migration policy data 244, which includes TEE migration policies for that TEE. The VSE migration policy data 244 for a TEE may include migration policies that specify allowed hardware TEE backends and backend and virtualization middleware version specifications for the destination host computer to which the TEE is permitted to migrate. The VSE migration policy data may be created based on user TEE creation parameters chosen by an application owner. In an embodiment, the VSE migration policy data is part of a TEE image and can be verified by the application attestation service as part of an initial launch attestation. During live migration of the TEE, the VSE migration policy data is verified and enforced by a migration agent 246, which is trusted software running inside each host computer in a cluster, such as the cluster 102 shown in FIG. 1.

An example of a data structure 300 of the VSE migration policy data 244 for a particular TEE in accordance with an embodiment of the invention is illustrated in FIG. 3. As shown in FIG. 3, a set 302 of sixteen (16) bits of the VSE migration policy data structure is a bitmap that specifies all the allowed hardware TEE backends for the TEE. Subsequent sets of bits of the VSE migration policy data structure include backend and virtualization middleware version specifications so that only certain host computers with specified TEE hardware and minimum versions of both the specified hardware and middleware can be chosen as a valid migration destination. In the example shown in FIG. 3, the VSE migration policy data structure includes a set 304 of eight (8) bits that specifies the minimum VSE API major version requirement for the destination host computer and a set 306 of eight (8) bits that specifies the minimum VSE API minor version requirement for the destination host computer. In addition, the VSE migration policy data structure includes a set 308 of sixteen (16) bits that specifies the minimum VMware ESXi™ version and a set 310 of sixteen (16) bits that specifies the minimum VSE Runtime version. The VSE migration policy data structure further includes a set 312 of sixteen (16) bits that specifies the minimum Intel SGX version, a set 314 of sixteen (16) bits that specifies the minimum AMD SEV version and a set 316 of sixteen (16) bits that specifies the minimum Intel Trust Domain Extensions (TDX) version. Lastly, the VSE migration policy data structure includes a set 318 of sixty-four (64) bits that is reserved for future policies.

Turning back to FIG. 2, each TEE 202 that is created by the VSE device 226 via the hardware TEE mechanism 214 further includes a migration runtime 238, which operates to handle the export of TEE code/data memory pages when the TEE is migrated from the host computer 200 to another host computer. The TEE export process may include transparent handling of architecture differences between the source host computer and the destination host computer by translating machine states from the host computer to the destination host computer (e.g., from SGX to SEV). In an embodiment, the migration runtime 238 is executed from a migration runtime library, which includes the necessary programs to enable the migration runtime. The migration runtime 238 is further described below with reference to FIG. 4.

The migration runtime 238 operates with the migration agent 246 in the host computer 200, which enforces migration policies for TEEs and transferring of TEE memory pages between host computers for TEE migrations. One migration agent is needed on each host computer in a cluster to serve all the migratable TEEs on that host computer. In some embodiments, the migration agent 246 is executed in a migration TEE 248, which can be implemented as an encrypted virtual machine or an SGX enclave, to ensure that the migration agent running on the host computer 200 is authentic, secure and trustworthy.

In an embodiment, the migration agent 246 is provisioned when the host computer 200 with the hypervisor 216 is provisioned. In addition, secure communication channels are established between the migration agent 246 of the host computer 200 and all the other migration agents in other host computers in the same cluster, e.g., in the same datacenter or in the same large network of host computers. Furthermore, since a user TEE in the host computer can locally attest the migration agent in the same host computer, a secure communication channel can be established between the migration agent of the host computer and each migratable user TEE in the host computer.

During a migration of a TEE, e.g., one of the TEEs 202 in the host computer 200, the migration runtime 238 in the user TEE will export user TEE memory pages through the secure communication channel to the migration agent 246. The migration agent 246 will then encrypt and export the TEE memory pages using a secret key, which is shared with all the other migration agents in the cluster. The encrypted TEE memory pages can then be saved on a local storage and exported immediately or at a later time to a destination host computer.

The TEE memory pages exported from the host computer 200 include the VSE migration policy data 244 of the TEE being migrated. All the TEE memory pages encrypted by the migration agent 246 can only be decrypted by other legitimate migration agents in the cluster since only those migration agents have the secret key needed to decrypt the encrypted TEE memory pages. When a destination host computer is chosen for the TEE being migrated, the encrypted VSE migration policy data is transferred to the migration agent of the destination host computer first, which then decrypts and verifies VSE migration policy data of the TEE. If any of the checks fail, the migration agent at the destination host computer will terminate the TEE migration process. Otherwise, the migration agent at the destination host will allow the TEE migration process to continue.

On the platform of the destination host computer, a new TEE with a migration runtime will be created. Instead of being attested by the TEE owner, the migration agent at the destination host computer can locally attest the new TEE and establish a secure communication channel with the new TEE, which is possible because the new TEE created at this stage only contains the runtime without any user code or data. The hypervisor at the destination host computer can then request the migration agent at the destination host to decrypt the migrated TEE memory pages and send them to the new TEE for restoration, which completes the TEE migration process.

Figure 4:
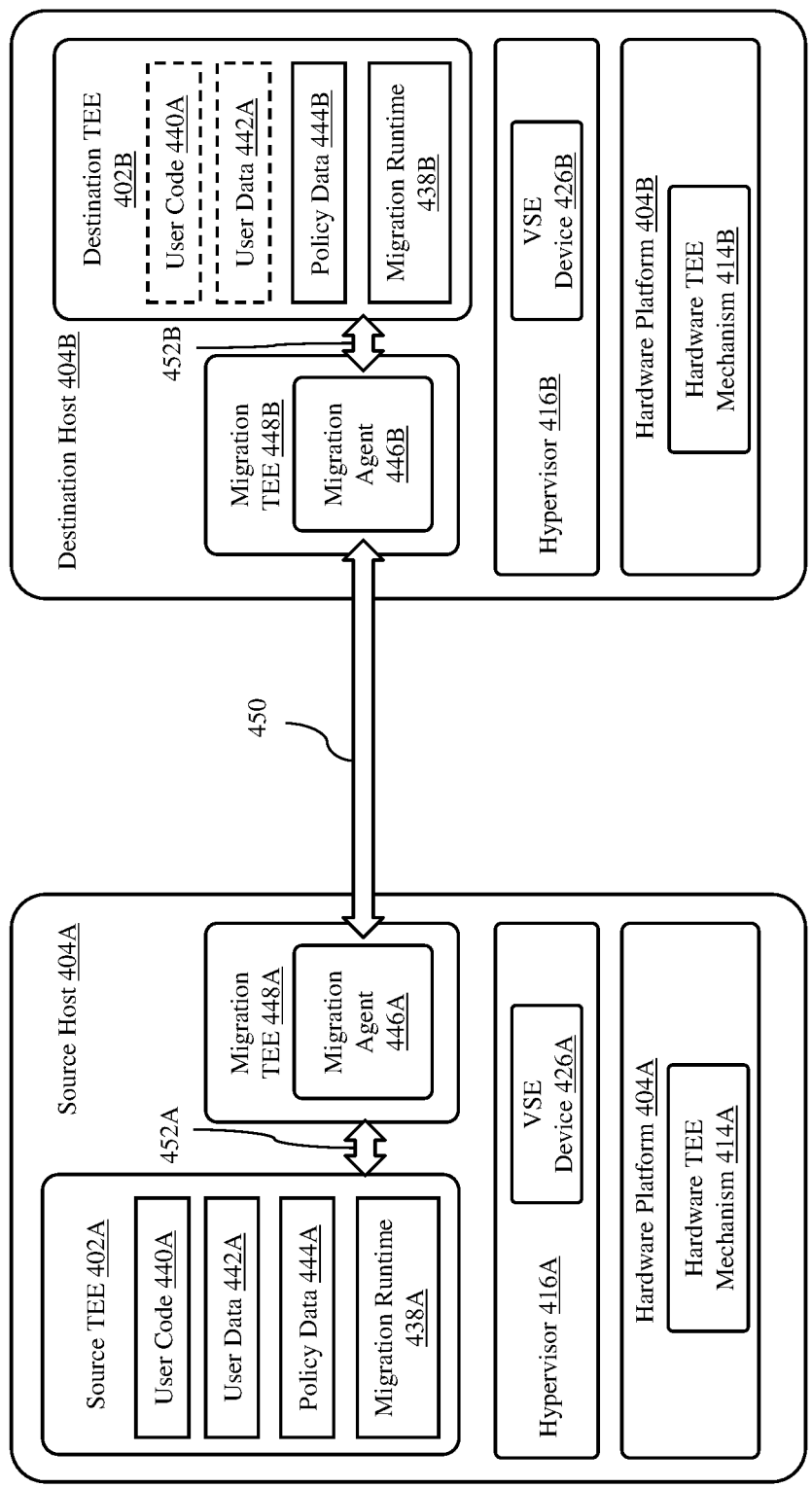
FIG. 4 illustrates an example of a TEE is being migrated from a source host computer to a destination host computer, which can be any two host computers in the distributed computing system, in accordance with an embodiment of the invention.

The TEE migration process in accordance with embodiments of the invention is further described using an example shown in FIG. 4. In this example, a source TEE 402A is being migrated from a source host computer 404A to a destination host computer 404B, which can be any two host computers 104 in the distributed computing system 100. In FIG. 4, the source host computer 404A is illustrated as including a hardware platform 408A with a hardware TEE mechanism 414A, a hypervisor 416A with a VSE device 426A, the source TEE 402A (which includes a migration runtime 438A, user code 440A, user data 442A and a VSE migration policy data 444A), and a migration agent 446A in a migration TEE 448A. Similarly, the destination host computer 404B is illustrated as including a hardware platform 408B with a hardware TEE mechanism 414B, a hypervisor 416B with a VSE device 426B, a destination TEE 402B (which includes a migration runtime 438B and a VSE migration policy data 444B), and a migration agent 446B in a migration TEE 448B. Other components of the source and destination host computers 404A and 404B, as described above with respect to the host computer 200, are not shown in FIG. 4.

In the example shown in FIG. 4, the hardware TEE mechanism 414A of the source host computer 404A may be an Intel SGX mechanism, which provides TEEs in the form of secure memory enclaves. In contrast, the hardware TEE mechanism 414B of the destination host computer 404B may be an AMD SEV mechanism, which provides TEEs in the form of secure TEE VMs. Thus, the destination TEE 402B and the migration TEE 448B in the destination host computer 404B may be TEE VMs.

When host computers are provisioned as part of a cluster, secure communication channels are set up between migration TEEs in the host computers. Thus, a secure communication channel 450 exists between the migration TEE 448A of the source host computer 404A and the migration TEE 448B of the destination host computer 404B. In addition, in a host computer, a secure communication channel is set up between each TEE and the migration TEE. This can be accomplished as part of the initial remote attestation of each TEE involving an application attestation service or at a later time between the migration runtime in the TEE and the migration TEE. Thus, in the example shown in FIG. 4, there is a secure communication channel 452A between the source TEE 402A and the migration TEE 448A of the source host computer 404A. Similarly, there is a secure communication channel 452B between the destination TEE 402B and the migration TEE 448B of the destination host computer 404B.

Figure 5A:
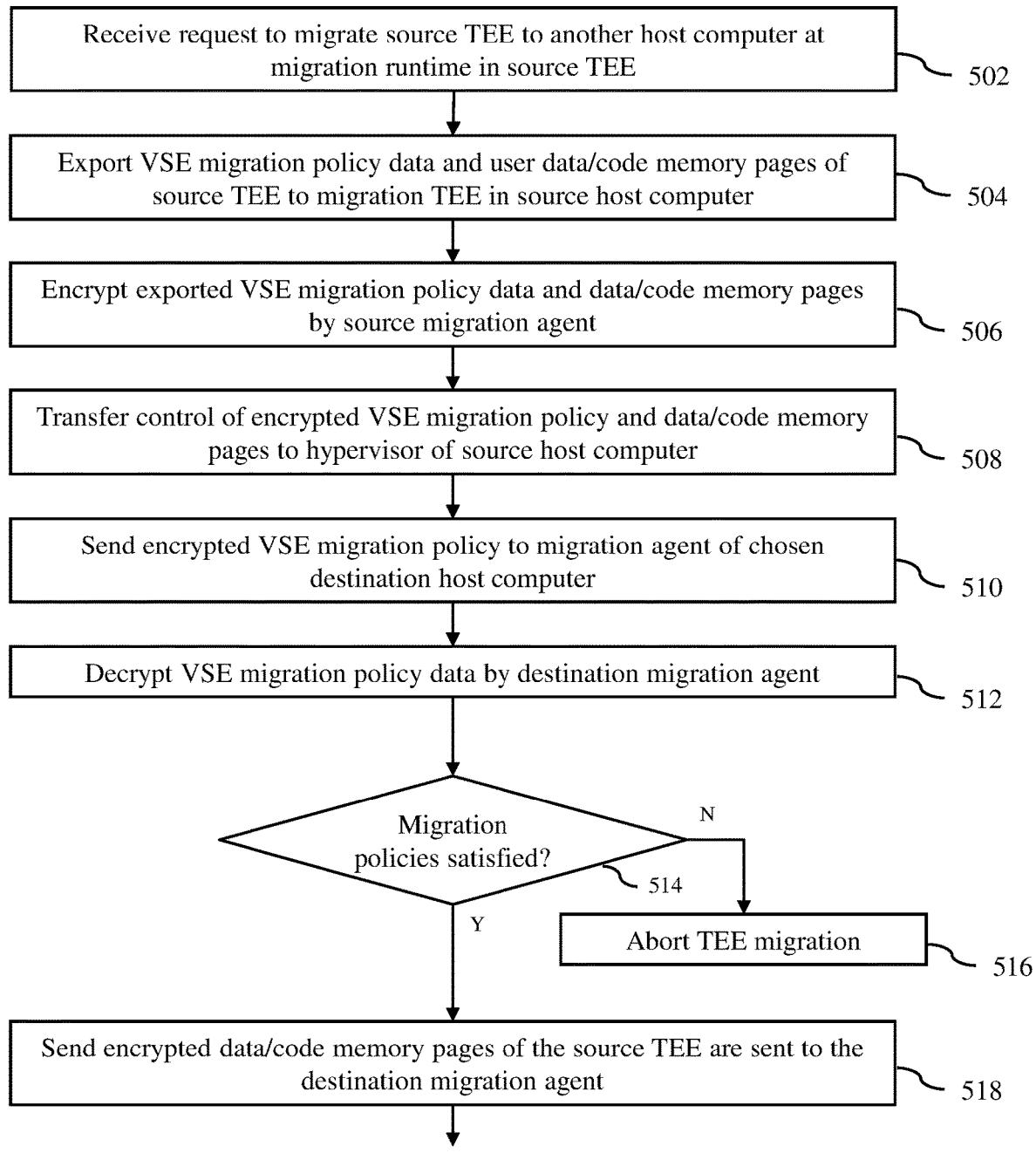
FIGS. 5A and 5B show a flow diagram of a TEE migration process in the distributed computer system in accordance with an embodiment of the invention.
Figure 5B:
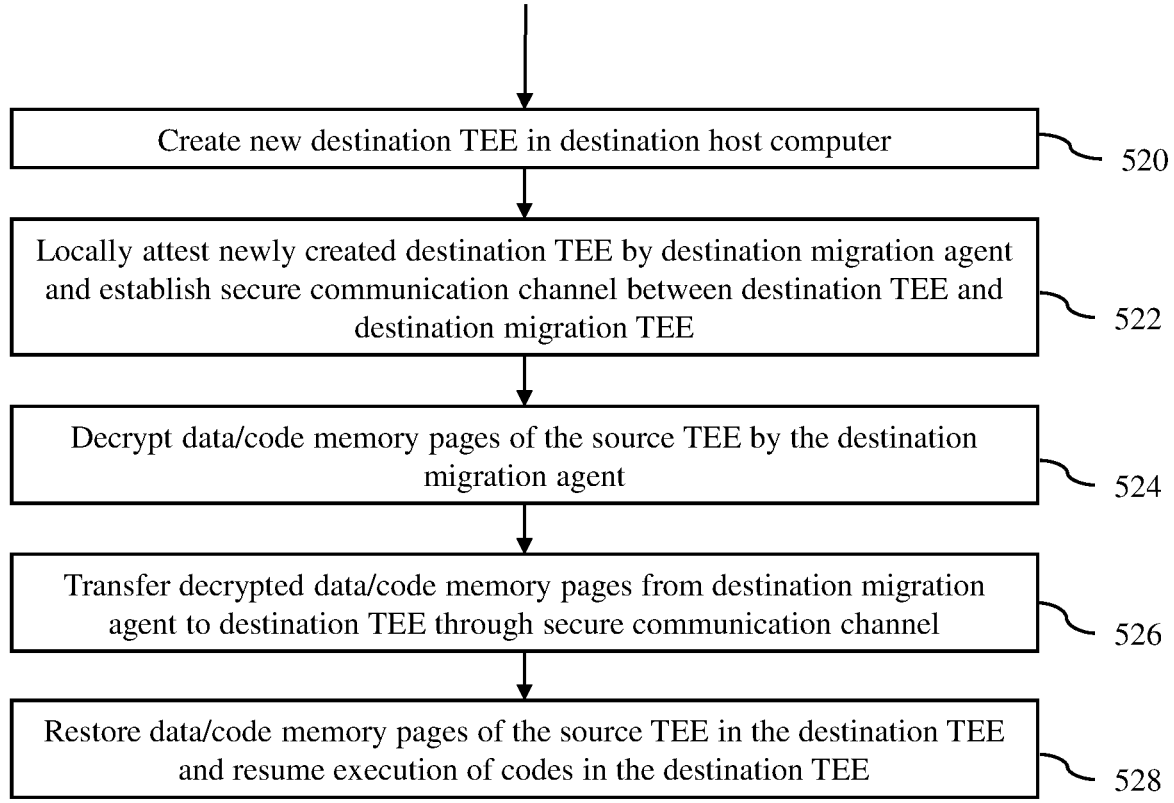

A TEE migration process in the distributed computer system 100 in accordance with an embodiment of the invention is now described with reference to a process flow diagram of FIGS. 5A and 5B using the example shown in FIG. 4. In this TEE migration process, the source TEE 402A in the source host computer 404A is being migrated from the source host computer 404A to the destination host computer 404B.

The TEE migration process begins at step 502, where a request to migrate the source TEE 402A in the source host computer 404A to another host computer in the cluster 102 is received at the migration runtime 438A in the source TEE. In an embodiment, the request may be sent from the hypervisor 416A to the migration runtime 438A in the source TEE 402A in response to user request or in response to instructions from the cluster management server 106.

Next, at step 504, the VSE migration policy data 444A and the memory pages of the user code 440A and the user data 442A of the source TEE 402A are exported from the source TEE to the migration TEE 448A through the secure communication channel 452A by the migration runtime 438A with the help of the migration agent 446A of the source host computer 404A (referred to herein as the "source migration agent").

Next, at step 506, the exported VSE migration policy data and the exported data/code memory pages are encrypted by the source migration agent 446A with a private secret key shared between all the migration agents in the cluster 102. Next, at step 508, control of the encrypted VSE migration policy and data/code memory pages is transferred to the hypervisor 416A of the source host computer 404A by the source migration agent 446A.

Next, at step 510, when a destination platform has been chosen, i.e., the destination host computer 404B in this example, the encrypted VSE migration policy data of the source TEE 402A is sent to the migration agent 446B of the destination host computer 404B (referred to herein as the "destination migration agent") through the secure communication channel 450 by the hypervisor 416A. In an embodiment, the destination host computer 404B is chosen from the host computers 104 in the cluster 102 by the cluster management server 106 in response to user selection or an automatic process that may use one or more criteria for destination host computer selection.

Next, at step 512, the encrypted VSE migration policy data 444 is decrypted by the destination migration agent 446B using the private secret key shared between all the migration agents in the cluster 102. At step 514, a determination is made by the destination migration agent 446B whether the destination host computer 404B satisfies the migration policies specified in the VSE migration policy data 444. As an example, a verification can be made whether the hardware TEE mechanism 414B of the destination host computer 404B is a mechanism listed in the VSE migration policy data 444 to which the source TEE 402A is permitted to be migrated. If the destination host computer 404B does satisfy the migration policies specified in the VSE migration policy data 444, the process proceeds to step 518. However, if the destination host computer does not satisfy the migration policies specified in the VSE migration policy data 444, the process proceeds to step 516, where the migration of the source TEE 402A to the destination host computer 404B is aborted by the destination migration agent 446B. In an embodiment, an error message may be sent from the destination migration agent 446B to the hypervisor 416A of the source host computer 404A as a notification of the TEE migration failure. The TEE migration process then comes to an end.

At step 518, the encrypted data/code memory pages of the source TEE 402A are sent to the destination migration agent 446B through the secure communication channel 450 by the hypervisor 416A. In an embodiment, the hypervisor 416A of the source host computer 404A is notified by the destination migration agent 446B that the destination host computer 404B satisfies the migration policies specified in the VSE migration policy data 444, and thus, the TEE migration is permitted to proceed. In other embodiments, the TEE memory pages may be transmitted to the destination migration agent 446B by the source migration agent 446A.

Next, at step 520, a new TEE, i.e., the destination TEE 402B, is created in the destination host computer 404B. In an embodiment, the migration agent 446B of the destination host computer 404B initiates the creation of the destination TEE 402B, which may involves sending instructions to the hardware TEE mechanism 414B to create the destination TEE. The new destination TEE 402B is created with the migration runtime 438B and the VSE migration policy data 444B, which may be identical to the VSE migration policy data 444A.

Next, at step 522, the newly created destination TEE 402B is locally attested by the destination migration agent 446B and the secure communication channel 452B is established between the destination TEE and the destination migration TEE 448B. In an embodiment, the local attestation of the destination TEE 402B by the destination migration agent 446B is based on the expected migration runtime measurement and the TEE hardware root of trust at the destination host computer 404. Because the content of the migration runtime is known before hand, the migration agent 446B can attest the integrity of the new destination TEE with the migration runtime with the help of the hardware at the destination host computer 404B.

Next, at step 524, the encrypted data/code memory pages of the source TEE 402A are decrypted by the destination migration agent 446B using the private shared secret key held by the destination migration agent. Next, at step 526, the decrypted data/code memory pages are transferred from the destination migration agent 446B to the destination TEE 402B through the secure communication channel 452B.

Next, at block 528, the data/code memory pages of the source TEE 402A are restored in the destination TEE 402B and execution of codes in the restored memory pages are resumed in the destination TEE. The restoration process will be dependent on the hardware of the destination host computer, and thus, can vary depending on the destination host computer. Thus, by creating the new TEE 402B at the destination host computer 404B and transferring the user data/code to the new TEE, the source TEE 402A has been migrated from the source host computer 404A to the destination host computer 404B. In an embodiment, the source migration agent 446A takes appropriate steps to ensure that the source TEE 402A cannot be resumed locally after successful migration since having two instances of the same TEE after migration in both the source and destination host computers could pose security issues. In some implementations, the source TEE 402A may be deleted in the source host computer 404A in response to a confirmation from the destination migration agent 446B to the source migration agent 446A that the data/code memory pages of the source TEE 402A have been successfully restored in the destination TEE 402B. The deletion of the source TEE 402A may involve instructions being sent from the source migration agent 446A to the hardware TEE mechanism 414A in the source host computer 404A via the VSE device 426A to delete the source TEE 402A.

Figure 6:
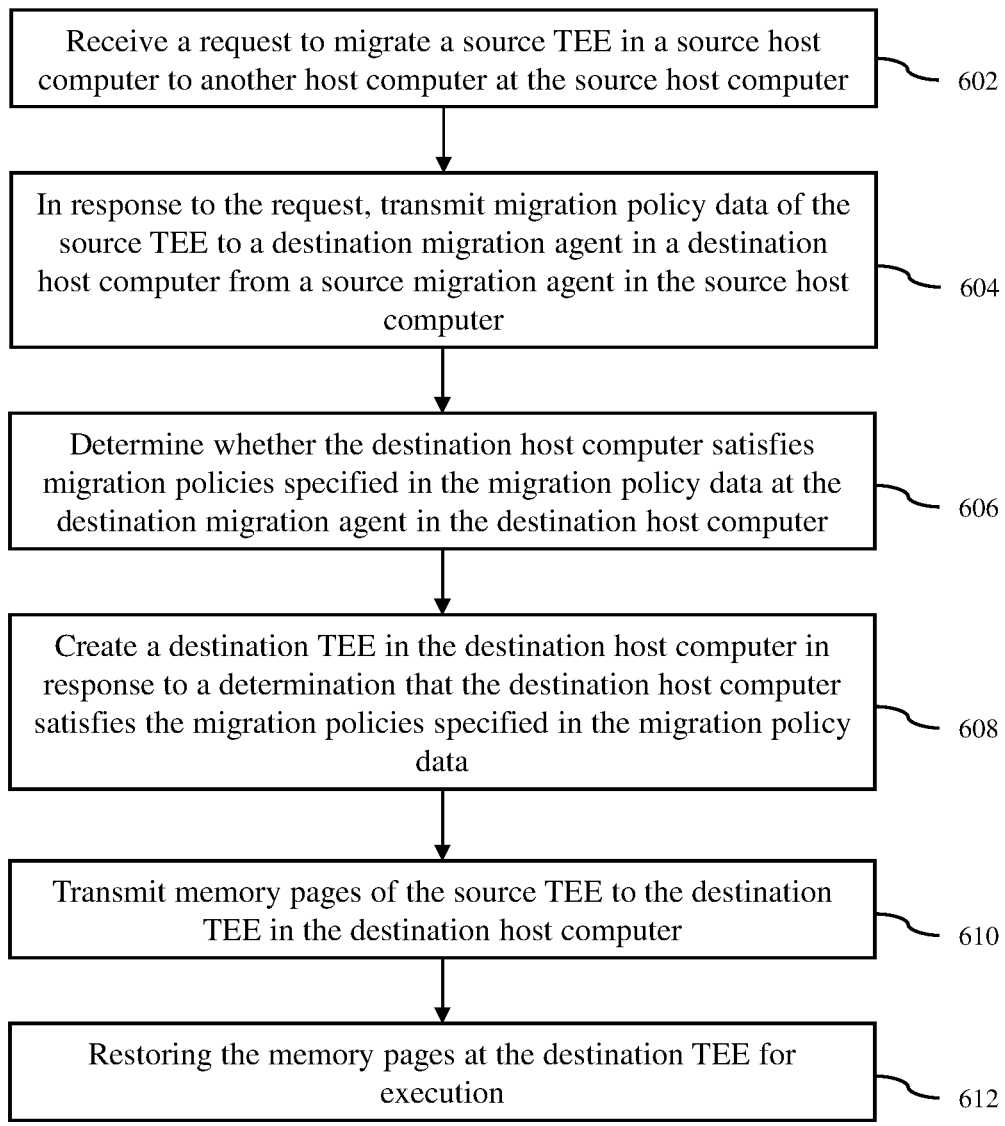
FIG. 6 is a flow diagram of a computer-implemented method for managing migration of TEEs based on migration policies in accordance with an embodiment of the invention.

A computer-implemented method for managing migration of trusted execution environments (TEEs) based on migration policies in accordance with an embodiment of the invention is described with reference to a flow diagram of FIG. 6. At block 602, a request to migrate a source TEE in a source host computer to another host computer is received at the source host computer. At block 604, in response to the request, migration policy data of the source TEE is transmitted to a destination migration agent in a destination host computer from a source migration agent in the source host computer. At block 606, whether the destination host computer satisfies migration policies specified in the migration policy data is determined at the destination migration agent in the destination host computer. At block 608, a destination TEE is created in the destination host computer in response to a determination that the destination host computer satisfies the migration policies specified in the migration policy data. At block 610, memory pages of the source TEE are transmitted to the destination TEE in the destination host computer. At block 612, the memory pages are restored at the destination TEE for execution.

The components of the embodiments as generally described in this document and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for managing migration of trusted execution environments (TEEs) based on migration policies, the method comprising:
    receiving a request to migrate a source TEE in a source host computer to another host computer at the source host computer, the source TEE including migration policy data and memory pages of user code and user data;
    in response to the request, transmitting the migration policy data of the source TEE to a destination migration agent in a destination host computer from a source migration agent in the source host computer, wherein the migration policy data includes a bitmap that specifies a plurality of allowed hardware TEE backends to which to migrate the source TEE;
    determining whether the destination host computer satisfies migration policies specified in the migration policy data at the destination migration agent in the destination host computer;
    creating a destination TEE with new migration policy data in the destination host computer in response to a determination that the destination host computer satisfies the migration policies specified in the migration policy data;
    transmitting the memory pages of the user code and the user data of the source TEE to the destination TEE with the new migration policy data in the destination host computer; and
    restoring the memory pages of the user code and the user data at the destination TEE for execution.

2. The method of claim 1, wherein the source migration agent in the source host computer is running in a TEE.

3. The method of claim 1, further comprising locally attesting the destination TEE by the destination migration agent in the destination host computer and establishing a secure communication channel between the destination migration agent and the destination TEE.

4. The method of claim 1, further comprising encrypting the migration policy data and the memory pages of the source TEE by the source migration agent using a private secret key shared by all migration agents in host computers of a cluster, including the source migration agent and the destination migration agent, prior to transmitting the migration policy data and the memory pages of the source TEE to the destination migration agent, wherein the memory pages of the user code and the user data of the source TEE are transmitted to the destination TEE from the destination migration agent.

5. The method of claim 4, further comprising decrypting the migration policy data and the memory pages of the source TEE by the destination migration agent using the private secret key.

6. The method of claim 1, wherein transmitting the migration policy data of the source TEE includes transmitting the migration policy data of the source TEE to the destination migration agent in the destination host computer from the source migration agent in the source host computer through a secure communication channel that is established when the source and destination migration agents are deployed in the source and destination host computers.

7. The method of claim 1, further comprising exporting the migration policy data and the memory pages from the source TEE to the source migration agent by a migration runtime running in the source TEE.

8. The method of claim 1, wherein the migration policy data specifies hardware and software version requirements of a host computer to which the source TEE is permitted to migrate.

9. A non-transitory computer-readable storage medium containing program instructions for managing migration of trusted execution environments (TEEs) based on migration policies, wherein execution of the program instructions by one or more processors of a computer system causes the one or more processors to perform steps comprising:
    receiving a request to migrate a source TEE in a source host computer to another host computer at the source host computer, the source TEE including migration policy data and memory pages of user code and user data;
    in response to the request, transmitting the migration policy data of the source TEE to a destination migration agent in a destination host computer from a source migration agent in the source host computer, wherein the migration policy data includes a bitmap that specifies a plurality of allowed hardware TEE backends to which to migrate the source TEE;
    determining whether the destination host computer satisfies migration policies specified in the migration policy data at the destination migration agent in the destination host computer;
    creating a destination TEE with new migration policy data in the destination host computer in response to a determination that the destination host computer satisfies the migration policies specified in the migration policy data;
    transmitting the memory pages of the user code and the user data of the source TEE to the destination TEE with the new migration policy data in the destination host computer; and
    restoring the memory pages of the user code and the user data at the destination TEE for execution.

10. The non-transitory computer-readable storage medium of claim 9, wherein the source migration agent in the source host computer is running in a TEE.

11. The non-transitory computer-readable storage medium of claim 9, wherein the steps further comprise locally attesting the destination TEE by the destination migration agent in the destination host computer and establishing a secure communication channel between the destination migration agent and the destination TEE.

12. The non-transitory computer-readable storage medium of claim 9, wherein the steps further comprise encrypting the migration policy data and the memory pages of the source TEE by the source migration agent using a private secret key shared by all migration agents in host computers of a cluster, including the source migration agent and the destination migration agent, prior to transmitting the migration policy data and the memory pages of the source TEE to the destination migration agent, wherein the memory pages of the user code and the user data of the source TEE are transmitted to the destination TEE from the destination migration agent.

13. The non-transitory computer-readable storage medium of claim 12, wherein the steps further comprise decrypting the migration policy data and the memory pages of the source TEE by the destination migration agent using the private secret key.

14. The non-transitory computer-readable storage medium of claim 9, wherein transmitting the migration policy data of the source TEE includes transmitting the migration policy data of the source TEE to the destination migration agent in the destination host computer from the source migration agent in the source host computer through a secure communication channel that is established when the source and destination migration agents are deployed in the source and destination host computers.

15. The non-transitory computer-readable storage medium of claim 9, wherein the steps further comprise exporting the migration policy data and the memory pages from the source TEE to the source migration agent by a migration runtime running in the source TEE.

16. The non-transitory computer-readable storage medium of claim 9, wherein the migration policy data specifies hardware and software version requirements of a host computer to which the source TEE is permitted to migrate.

17. A computer system comprising:
  memory; and
  at least one processor configured to:
    receive a request to migrate a source TEE in a source host computer to another host computer at the source host computer, the source TEE including migration policy data and memory pages of user code and user data;
    in response to the request, transmit the migration policy data of the source TEE to a destination migration agent in a destination host computer from a source migration agent in the source host computer, wherein the migration policy data includes a bitmap that specifies a plurality of allowed hardware TEE backends to which to migrate the source TEE;
    determine whether the destination host computer satisfies migration policies specified in the migration policy data at the destination migration agent in the destination host computer;
    create a destination TEE with new migration policy data in the destination host computer in response to a determination that the destination host computer satisfies the migration policies specified in the migration policy data;
    transmit the memory pages of the user code and the user data of the source TEE to the destination TEE with the new migration policy data in the destination host computer; and
    restore the memory pages of the user code and the user data at the destination TEE for execution.

18. The computer system of claim 17, wherein the source migration agent in the source host computer is running in a TEE.

19. The computer system of claim 17, wherein the at least one processor is configured to locally attest the destination TEE by the destination migration agent in the destination host computer and establish a secure communication channel between the destination migration agent and the destination TEE.

20. The computer system of claim 17, wherein the at least one processor is configured to:
  encrypt the migration policy data and the memory pages of the source TEE by the source migration agent using a private secret key shared by all migration agents in host computers of a cluster, including the source migration agent and the destination migration agent, prior to transmitting the migration policy data and the memory pages of the source TEE to the destination migration agent; and
  decrypt the migration policy data and the memory pages of the source TEE by the destination migration agent using the private secret key,
  wherein the memory pages of the user code and the user data of the source TEE that are decrypted are transmitted to the destination TEE from the destination migration agent.

* * * * *